(12) United States Patent
Mellet et al.

(10) Patent No.: US 8,827,860 B2
(45) Date of Patent: *Sep. 9, 2014

(54) TORQUE TRANSMITTING DEVICE CONTROL STRATEGY FOR A NINE SPEED TRANSMISSION

(75) Inventors: Edward W. Mellet, Rochester Hills, MI (US); Scott H. Wittkopp, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 296 days.

This patent is subject to a terminal disclaimer.

(21) Appl. No.: 13/310,272

(22) Filed: Dec. 2, 2011

(65) Prior Publication Data

US 2012/0178578 A1 Jul. 12, 2012

Related U.S. Application Data

(60) Provisional application No. 61/430,505, filed on Jan. 6, 2011.

(51) Int. Cl.
 *F16H 3/62* (2006.01)
 *F16H 3/66* (2006.01)
 *F16H 61/00* (2006.01)

(52) U.S. Cl.
 CPC .............. *F16H 3/666* (2013.01); *F16H 3/66* (2013.01); *F16H 2200/2012* (2013.01); *F16H 2200/0065* (2013.01); *F16H 2200/2046* (2013.01); *F16H 2312/04* (2013.01); *F16H 61/0059* (2013.01)

USPC .......................................... 475/254; 475/276

(58) Field of Classification Search
 USPC ................... 475/275, 296, 276, 254, 280, 330
 See application file for complete search history.

(56) References Cited

U.S. PATENT DOCUMENTS

| | | | |
|---|---|---|---|
| 6,176,803 B1 | 1/2001 | Meyer et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 8,187,130 B1 * | 5/2012 | Mellet et al. | 475/5 |
| 2004/0029673 A1 * | 2/2004 | Lipman | 475/284 |
| 2012/0178564 A1 * | 7/2012 | Vahabzadeh et al. | 475/1 |
| 2012/0178581 A1 * | 7/2012 | Wittkopp et al. | 475/275 |
| 2012/0178582 A1 * | 7/2012 | Wittkopp et al. | 475/276 |
| 2012/0214633 A1 * | 8/2012 | Mellet et al. | 475/149 |
| 2012/0214635 A1 * | 8/2012 | Mellet et al. | 475/276 |

FOREIGN PATENT DOCUMENTS

CN 201357751 Y 12/2009
CN 101852278 A 10/2010

* cited by examiner

*Primary Examiner* — Justin Holmes
*Assistant Examiner* — Stacy Fluhart

(57) ABSTRACT

A transmission includes an input member, an output member, four planetary gear sets, a plurality of coupling members and a plurality of torque transmitting devices. The transmission input member is connected to a dry launch clutch. Each of the planetary gear sets includes first, second and third members. The torque transmitting devices are for example clutches and brakes. A hill hold control strategy is provided for locking the transmission without using the dry launch clutch by selectively engaging combinations of the clutches and brakes.

10 Claims, 2 Drawing Sheets

| Gear State | Gear Ratio | Ratio Step | 30 | 32 | 34 | 36 | 26 | 28 |
|---|---|---|---|---|---|---|---|---|
| Rev | -5.550 |  | X |  |  | X |  |  |
| N |  | -0.96 |  |  |  | O |  |  |
| 1st | 5.767 |  |  | X |  | X |  |  |
| 2nd | 3.461 | 1.67 |  |  |  | X |  | X |
| 3rd | 2.437 | 1.42 |  | X |  |  |  | X |
| 4th | 1.687 | 1.44 |  |  | X |  |  | X |
| 5th | 1.278 | 1.32 | X |  |  |  |  | X |
| 6th | 1.000 | 1.28 |  |  |  |  | X | X |
| 7th | 0.828 | 1.21 | X |  |  |  | X |  |
| 8th | 0.721 | 1.15 |  |  | X |  | X |  |
| 9th | 0.614 | 1.13 |  | X |  |  | X |  |

TORQUE TRANSMITTING DEVICE CONTROL STRATEGY FOR A NINE SPEED TRANSMISSION

CROSS-REFERENCE

This application claims the benefit of U.S. Provisional Application No. 61/430,505, filed Jan. 6, 2011. The entire contents of the above application are incorporated herein by reference.

FIELD

The invention relates generally to a torque transmitting device control strategy for a nine speed transmission having a plurality of planetary gear sets and a plurality of torque transmitting devices, and more particularly to a torque transmitting device control strategy for a nine speed transmission to implement a hill-hold clutch control strategy.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. The transmission input member is connected to a dry launch clutch. Each of the planetary gear sets includes first, second and third members. The torque transmitting devices are for example clutches and brakes. A hill hold control strategy is provided for locking the transmission without using the dry launch clutch by selectively engaging combinations of the clutches and brakes.

In one embodiment, a method for controlling a transmission in a motor vehicle includes providing a launch clutch and providing a transmission having an input member connected to the launch clutch, an output member, first, second, third, and fourth planetary gear sets each having a first, a second, and a third member, wherein the second member of the first planetary gear set is connected with the second member of the second planetary gear set, the third member of the first planetary gear set is connected with the third member of the second planetary gear set and the first member of the third planetary gear set, the second member of the third planetary gear set is connected with the second member of the fourth planetary gear set, and the third member of the third planetary gear set is connected with the third member of the fourth planetary gear set, and wherein a first clutch connects the first member of the second planetary gear set with the third members of the third and fourth planetary gear sets, a second clutch connects the first member of the second planetary gear set with the first member of the fourth planetary gear set, a first brake connects the first member of the first planetary gear set with a stationary member, a second brake connects the second members of the first and second planetary gear sets with the stationary member, a third brake connects the first member of the third planetary gear set and the third members of the first and second planetary gear sets with the stationary member, and a fourth brake connects the third members of the third and fourth planetary gear sets with the stationary member. Next the transmission is commanded into a Drive mode of operation and it is determined that the output shaft of the transmission should be rotationally fixed. Finally, the first clutch, the second clutch, the first brake, the second brake, the third brake, and the fourth brake are engaged in combinations of at least two in order to rotationally fix the output shaft.

In one example, engaging the first clutch, the second clutch, the first brake, the second brake, the third brake, and the fourth brake in combinations of at least two includes engaging the third brake and the fourth brake to rotationally fix the output shaft.

In another example, engaging the first clutch, the second clutch, the first brake, the second brake, the third brake, and the fourth brake in combinations of at least two includes engaging the first clutch, the second brake, and the third brake to rotationally fix the output shaft.

In yet another example, engaging the first clutch, the second clutch, the first brake, the second brake, the third brake, and the fourth brake in combinations of at least two includes engaging the first clutch, the first brake, and third brake to rotationally fix the output shaft.

In yet another example, determining that the output shaft of the transmission should be rotationally fixed includes sensing that the motor vehicle is at a negative speed and sensing that a throttle position or accelerator pedal position is below a predetermined value.

In another embodiment, a method for controlling a transmission in a motor vehicle includes providing a launch clutch, providing a transmission having an input member connected to the launch clutch, an output member, first, second, third, and fourth planetary gear sets each having a sun gear, a ring gear, and a carrier, wherein the ring gear of the first planetary gear set is connected with the ring gear of the second planetary gear set, the carrier of the first planetary gear set is connected with the carrier of the second planetary gear set and the sun gear of the third planetary gear set, the ring gear of the third planetary gear set is connected with the carrier of the fourth planetary gear set, and the carrier of the third planetary gear set is connected with the ring gear of the fourth planetary gear set, and wherein a first clutch connects the sun gear of the second planetary gear set with the carrier of the third planetary gear set and the ring gear of the fourth planetary gear set, a second clutch connects the sun gear of the second planetary gear set with the sun gear of the fourth planetary gear set, a first brake connects the sun gear of the first planetary gear set with a stationary member, a second brake connects the ring gears of the first and second planetary gear sets with the stationary member, a third brake connects the sun gear of the third planetary gear set and the carriers of the first and second planetary gear sets with the stationary member, and a fourth brake connects the carrier of the third planetary gear set and the ring gear of the fourth planetary gear set with the stationary member, commanding the transmission into a Drive mode of operation, determining that the output shaft of the transmission should be rotationally fixed, and engaging the first clutch, the second clutch, the first brake, the second brake, the third brake, and the fourth brake in combinations of at least two in order to rotationally fix the output shaft.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
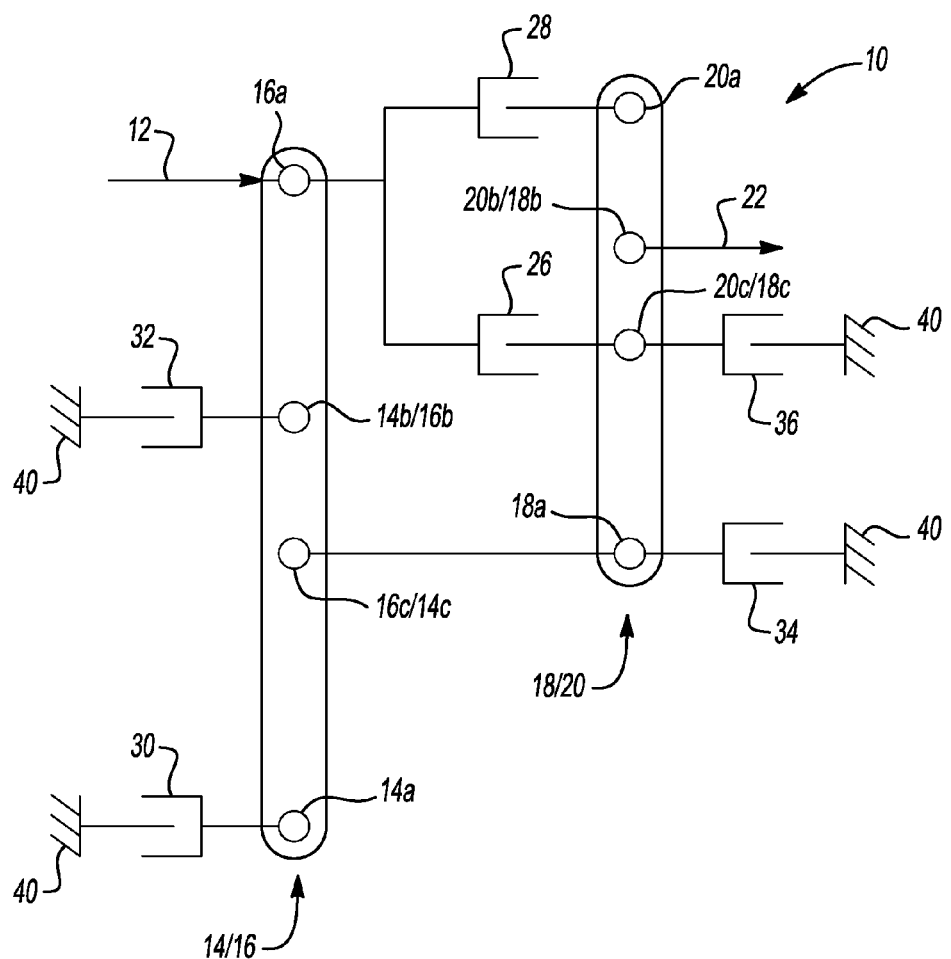
FIG. 1 is a lever diagram of an embodiment of a nine speed transmission according to the present invention.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the first node 16A of the second planetary gear set 16. The output member 22 is coupled to the second node 18B of the third planetary gear set 18 and the second node 20B of the fourth planetary gear set 20. The second node 14B of the first planetary gear set 14 is coupled to the second node 16B of the second planetary gear set 16. The third node 14C of the first planetary gear set 14 is coupled to the third node 16C of the second planetary gear set 16 and the first node 18A of the third planetary gear set 18. The second node 18B of the third planetary gear set 18 is coupled to the second node 20B of the fourth planetary gear set 20. The third node 18C of the third planetary gear set 18 is coupled to the third node 20C of the fourth planetary gear set 20.

A first clutch 26 selectively connects the first node 16A of the second planetary gear set 16 and the input member 12 with the third node 18C of the third planetary gear set 18 and the third node 20C of the fourth planetary gear set 20. A second clutch 28 selectively connects the first node 16A of the second planetary gear set 16 and the input member 12 with the first node 20A of the fourth planetary gear set 20. A first brake 30 selectively connects the first node 14A of the first planetary gear set 14 to a stationary member or a transmission housing 40. A second brake 32 selectively connects the second node 14B of the first planetary gear set 14 and the second node 16B of the second planetary gear set 16 to a stationary member or transmission housing 40. A third brake 34 selectively connects the third node 14C of the first planetary gear set, the third node 16C of the second planetary gear set 16, and the first node 18A of the third planetary gear set 18 to the stationary member or transmission housing 40. A fourth brake 36 selectively connects the third node 18C of the third planetary gear set 18 and the third node 20C of the fourth planetary gear set 20 to the stationary member or transmission housing 40.

Figures 2, 3:
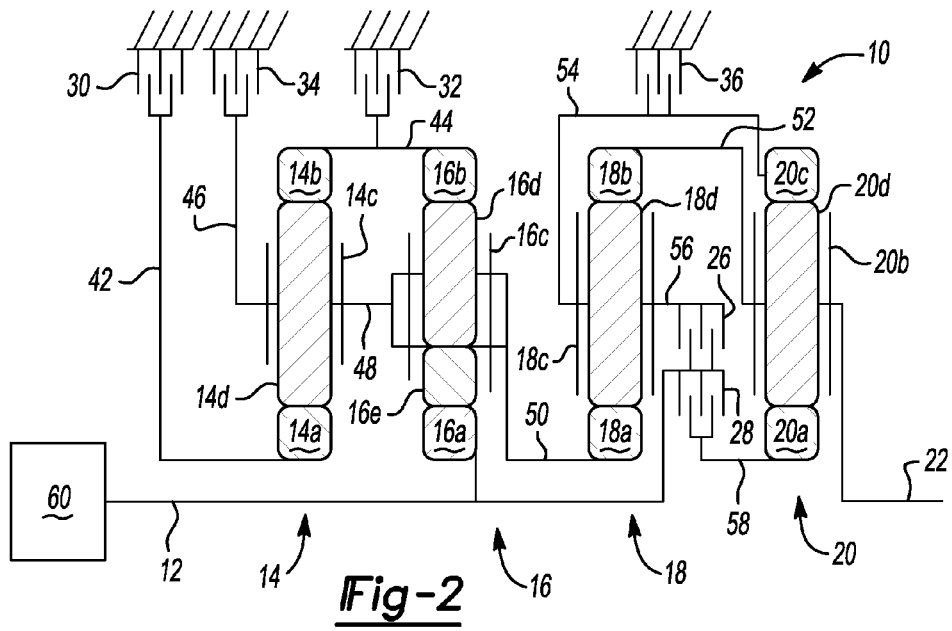
FIG. 2 is a diagrammatic view of an embodiment of a nine speed transmission according to the present invention.
FIG. 3 is a truth table presenting the state of engagement of the various torque transmitting elements in each of the available forward and reverse speeds or gear ratios of the transmission illustrated in FIGS. 1 and 2.

Referring now to FIG. 2, a stick diagram presents a schematic layout of the embodiment of the nine speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a planet gear carrier member 14C and a ring gear member 14B. The sun gear member 14A is connected for common rotation with a first shaft or interconnecting member 42. The ring gear member 14B is connected for common rotation with a second shaft or interconnecting member 44. The planet gear carrier member 14C rotatably supports a set of planet gears 14D (only one of which is shown) and is connected for common rotation with a third shaft or interconnecting member 46 and a fourth shaft or interconnecting member 48. The planet gears 14D are each configured to intermesh with both the sun gear member 14A and the ring gear member 14B.

The second planetary gear set 16 includes a sun gear member 16A, a planet carrier member 16C that rotatably supports a set of planet gears 16D and 16E, and a ring gear member 16B. The sun gear member 16A is connected for common rotation with the input member 12. The ring gear member 16B is connected for common rotation with the second shaft or interconnecting member 44. The planet carrier member 16C is connected for common rotation with the fourth shaft or interconnecting member 48 and a fifth shaft or interconnecting member 50. The planet gears 16D are each configured to intermesh with both the ring gear member 16B and the planet gears 16E. The planet gears 16E are each configured to intermesh with both the planet gears 16D and the sun gear 16A.

The third planetary gear set 18 includes a sun gear member 18A, a ring gear member 18B and a planet carrier member 18C that rotatably supports a set of planet gears 18D. The sun gear member 18A is connected for common rotation with the fifth interconnecting member 50. The ring gear member 18B is connected for common rotation with a sixth shaft or interconnecting member 52. The planet carrier member 18C is connected for common rotation with a seventh shaft or interconnecting member 54 and with an eighth shaft or interconnecting member 56. The planet gears 18D are each configured to intermesh with both the sun gear member 18A and the ring gear member 18B.

The fourth planetary gear set 20 includes a sun gear member 20A, a ring gear member 20C and a planet carrier member 20B that rotatably supports a set of planet gears 20D. The sun gear member 20A is connected for common rotation with a ninth shaft or interconnecting member 58. The ring gear member 20C is connected for common rotation with the seventh interconnecting member 54. The planet carrier member 20B is connected for common rotation with the sixth interconnecting member 52 and with the output member 22. The planet gears 20D are each configured to intermesh with both the sun gear member 20A and the ring gear member 20C.

The input shaft or member 12 is continuously connected to a dry clutch launch device 60. The dry clutch launch device 60 is selectively connected to an engine or other prime mover (not shown). The output shaft or member 22 is preferably continuously connected with the final drive unit or transfer case (not shown).

The torque-transmitting mechanisms or clutches 26, 28 and brakes 30, 32, 34, 36 allow for selective interconnection of the shafts or interconnecting members, members of the planetary gear sets and the housing. For example, the first clutch 26 is selectively engageable to connect the eighth interconnecting member 56 with the input member 12. The second clutch 28 is selectively engageable to connect the ninth interconnecting member 58 with the input member 12. The first brake 30 is selectively engageable to connect the first interconnecting member 42 to the stationary member or transmission housing 40 in order to restrict the sun gear member 14A of the first planetary gear set 14 from rotating relative to the stationary member or transmission housing 40. The second brake 32 is selectively engageable to connect the second interconnecting member 44 to the stationary member or transmission housing 40 in order to restrict the ring gear member 14B of the first planetary gear set 14 and the ring gear member 16B of the second planetary gear set 16 from rotating relative to the stationary member or transmission housing 40. The third brake 34 is selectively engageable to connect the third interconnecting member 46 to the stationary member or transmission housing 40 in order to restrict the planet carrier member 14C of the first planetary gear set 14, the planet carrier member 16C of the second planetary gear set 16, and the sun gear 18A of the third planetary gear set 18 from rotating relative to the stationary member or transmission housing 40. The fourth brake 36 is selectively engageable to connect the seventh interconnecting member 54 to the stationary member or transmission housing 40 in order to restrict the planet carrier member 18C of the third planetary gear set 18 and the ring gear member 20C of the fourth planetary gear set 20 from rotating relative to the stationary element or transmission housing 40.

Referring now to FIGS. 2 and 3, the operation of the embodiment of the nine speed transmission 10 will be described. It will be appreciated that the transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34, and fourth brake 36), as will be explained below. FIG. 3 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first brake 30 and the fourth brake 36 are engaged or activated. The first brake 30 connects the first interconnecting member 42 to the stationary member or transmission housing 40 in order to restrict the sun gear member 14A of the first planetary gear set 14 from rotating relative to the stationary member or transmission housing 40. The fourth brake 36 connects the seventh interconnecting member 54 to the stationary member or transmission housing 40 in order to restrict the planet carrier member 18C of the third planetary gear set 18 and the ring gear member 20C of the fourth planetary gear set 20 from rotating relative to the stationary element or transmission housing 40. Likewise, the nine forward ratios are achieved through different combinations of clutch and brake engagement, as shown in FIG. 3.

During certain operating conditions, it is desirable to hold the transmission output shaft stationary while in a Drive mode of operation, such as holding the motor vehicle on a hill. The determination whether to fix the output shaft while in Drive includes sensing a negative speed using a bi-directional sensor. If the motor vehicle is in Drive with a negative speed and below a pre-determined throttle or accelerator pedal position (for example, less than 5% engagement) then holding the output shaft stationary would be desired. The output shaft would be released when throttle or accelerator pedal positions was sensed to be above the pre-determined value. In order to not engage the dry launch clutch 60, a combination of the clutches 26, 28 and brakes 30, 32, 34, and 36 must be engaged to hold the transmission output shaft stationary. With reference to FIG. 1, in order to lock the output shaft 22 for any transmission corresponding to the lever diagram, there are three alternative engagement/disengagement strategies: (1) nodes 18C/20C and 18A are grounded (or connected to a stationary housing); (2) the input shaft 12 is disconnected by disengaging the dry launch clutch 60 and nodes 14B/16B, 18C/20C, and 18A are grounded (or connected to a stationary housing); or (3) the input shaft 12 is disconnected by disengaging the dry launch clutch 60 and nodes 14A, 14B/16B, and 18C/20C are grounded (or connected to a stationary housing). With reference to FIG. 2, in order to lock the output shaft 22, there are three alternative engagement/disengagement strategies: (1) apply or engage the brakes 34 and 36; (2) apply or engage the clutch 26 and the brakes 32 and 34; or (3) apply or engage the clutch 26 and the brakes 30 and 34.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for controlling a transmission in a motor vehicle, the method comprising:
   providing a launch clutch;
   providing the transmission having an input member connected to the launch clutch, an output member, first, second, third, and fourth planetary gear sets each having a first, a second, and a third member, wherein the second member of the first planetary gear set is connected with the second member of the second planetary gear set, the third member of the first planetary gear set is connected with the third member of the second planetary gear set and the first member of the third planetary gear set, the second member of the third planetary gear set is connected with the second member of the fourth planetary gear set, and the third member of the third planetary gear set is connected with the third member of the fourth planetary gear set, and wherein a first clutch connects the first member of the second planetary gear set with the third members of the third and fourth planetary gear sets, a second clutch connects the first member of the second planetary gear set with the first member of the fourth planetary gear set, a first brake connects the first member of the first planetary gear set with a stationary member, a second brake connects the second members of the first and second planetary gear sets with the stationary member, a third brake connects the first member of the third planetary gear set and the third members of the first and second planetary gear sets with the stationary member, and a fourth brake connects the third members of the third and fourth planetary gear sets with the stationary member;

commanding the transmission into a Drive mode of operation;

determining that the output shaft of the transmission should be rotationally fixed; and engaging, in combinations of at least two at a time, the first clutch, the second clutch, the first brake, the second brake, the third brake, and the fourth brake in order to rotationally fix the output shaft.

2. The method of claim 1 wherein engaging the first clutch, the second clutch, the first brake, the second brake, the third brake, and the fourth brake in combinations of at least two includes engaging the third brake and the fourth brake to rotationally fix the output shaft.

3. The method of claim 1 wherein engaging the first clutch, the second clutch, the first brake, the second brake, the third brake, and the fourth brake in combinations of at least two includes engaging the first clutch, the second brake, and the third brake to rotationally fix the output shaft.

4. The method of claim 1 wherein engaging the first clutch, the second clutch, the first brake, the second brake, the third brake, and the fourth brake in combinations of at least two includes engaging the first clutch, the first brake, and third brake to rotationally fix the output shaft.

5. The method of claim 1 wherein determining that the output shaft of the transmission should be rotationally fixed includes sensing that the motor vehicle is at a negative speed and sensing that a throttle position or accelerator pedal position is below a predetermined value.

6. A method for controlling a transmission in a motor vehicle, the method comprising:

providing a launch clutch;

providing the transmission having an input member connected to the launch clutch, an output member, first, second, third, and fourth planetary gear sets each having a sun gear, a ring gear, and a carrier, wherein the ring gear of the first planetary gear set is connected with the ring gear of the second planetary gear set, the carrier of the first planetary gear set is connected with the carrier of the second planetary gear set and the sun gear of the third planetary gear set, the ring gear of the third planetary gear set is connected with the carrier of the fourth planetary gear set, and the carrier of the third planetary gear set is connected with the ring gear of the fourth planetary gear set, and wherein a first clutch connects the sun gear of the second planetary gear set with the carrier of the third planetary gear set and the ring gear of the fourth planetary gear set, a second clutch connects the sun gear of the second planetary gear set with the sun gear of the fourth planetary gear set, a first brake connects the sun gear of the first planetary gear set with a stationary member, a second brake connects the ring gears of the first and second planetary gear sets with the stationary member, a third brake connects the sun gear of the third planetary gear set and the carriers of the first and second planetary gear sets with the stationary member, and a fourth brake connects the carrier of the third planetary gear set and the ring gear of the fourth planetary gear set with the stationary member;

commanding the transmission into a Drive mode of operation;

determining that the output shaft of the transmission should be rotationally fixed; and engaging, in combinations of at least two at a time, the first clutch, the second clutch, the first brake, the second brake, the third brake, and the fourth brake in order to rotationally fix the output shaft.

7. The method of claim 6 wherein engaging the first clutch, the second clutch, the first brake, the second brake, the third brake, and the fourth brake in combinations of at least two includes engaging the third brake and the fourth brake to rotationally fix the output shaft.

8. The method of claim 6 wherein engaging the first clutch, the second clutch, the first brake, the second brake, the third brake, and the fourth brake in combinations of at least two includes engaging the first clutch, the second brake, and the third brake to rotationally fix the output shaft.

9. The method of claim 6 wherein engaging the first clutch, the second clutch, the first brake, the second brake, the third brake, and the fourth brake in combinations of at least two includes engaging the first clutch, the first brake, and third brake to rotationally fix the output shaft.

10. The method of claim 6 wherein determining that the output shaft of the transmission should be rotationally fixed includes sensing that the motor vehicle is at a negative speed and sensing that a throttle position or accelerator pedal position is below a predetermined value.

\* \* \* \* \*